(12) United States Patent
Barribeau et al.

(10) Patent No.: US 10,933,644 B2
(45) Date of Patent: Mar. 2, 2021

(54) PRINT CARTRIDGES WITH LIGHT PIPES AND TOUCH SENSITIVE CIRCUITS

(71) Applicant: Hewlett-Packard Development Company, L.P., Spring, TX (US)

(72) Inventors: Jeremy Barribeau, Vancouver, WA (US); Benjamin Coughlin, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/616,483

(22) PCT Filed: Jul. 20, 2017

(86) PCT No.: PCT/US2017/043010
§ 371 (c)(1),
(2) Date: Nov. 24, 2019

(87) PCT Pub. No.: WO2019/017948
PCT Pub. Date: Jan. 21, 2019

(65) Prior Publication Data
US 2020/0171835 A1    Jun. 4, 2020

(51) Int. Cl.
*B41J 2/175* (2006.01)
*G06F 3/042* (2006.01)

(52) U.S. Cl.
CPC .......... *B41J 2/17513* (2013.01); *G06F 3/042* (2013.01); *B41J 2/1752* (2013.01); *B41J 2/17546* (2013.01); *G06F 2203/04102* (2013.01)

(58) Field of Classification Search
CPC .. B41J 2/17513; B41J 2/17566; B41J 2/1752; B41J 2/1753; B41J 2/17543; B41J 2/17546; B41J 2002/17573; G06F 3/042
See application file for complete search history.

(56) References Cited

U.S. PATENT DOCUMENTS

| | | | |
|---|---|---|---|
| 4,907,018 A * | 3/1990 | Pinkerpell et al. | .... B41J 2/1752 |
| 5,616,929 A | 4/1997 | Hara | |
| 6,097,405 A * | 8/2000 | Lo et al. | .............. B41J 2/17546 |
| 6,174,046 B1 | 1/2001 | Reid et al. | |
| 7,527,344 B2 | 5/2009 | Kitagawa et al. | |
| 7,559,635 B2 | 7/2009 | Conway et al. | |
| 7,628,181 B2 | 12/2009 | Nicodem et al. | |
| 7,798,622 B2 | 9/2010 | Silverbrook | |
| 8,449,091 B2 | 5/2013 | Kanbe et al. | |
| 2003/0001018 A1 | 1/2003 | Hussey et al. | |

(Continued)

FOREIGN PATENT DOCUMENTS

| | | |
|---|---|---|
| DE | 102015008200 | 12/2016 |
| GB | 2477297 B | 8/2011 |
| JP | H0868683 | 3/1996 |

OTHER PUBLICATIONS

Canon, Getting the Ink Level Information, May 16, 2008 < http://support-th.canon-asia.com/contents/TH/EN/8200181500.html >.

*Primary Examiner* — Juanita D Jackson
(74) *Attorney, Agent, or Firm* — Rahman LLC

(57) ABSTRACT

An example print cartridge (10) is described including a body component (15), a hollow tube (30) extending through the body component and visible on a portion of a surface (20, 25) of the body component, and a touch sensor (45) exposed on the surface (20) of the body component (15).

20 Claims, 8 Drawing Sheets

(56) References Cited

U.S. PATENT DOCUMENTS

2008/0036813 A1 2/2008 Conway et al.
2013/0188080 A1 7/2013 Olsson et al.
2015/0022595 A1 1/2015 Kim et al.

* cited by examiner

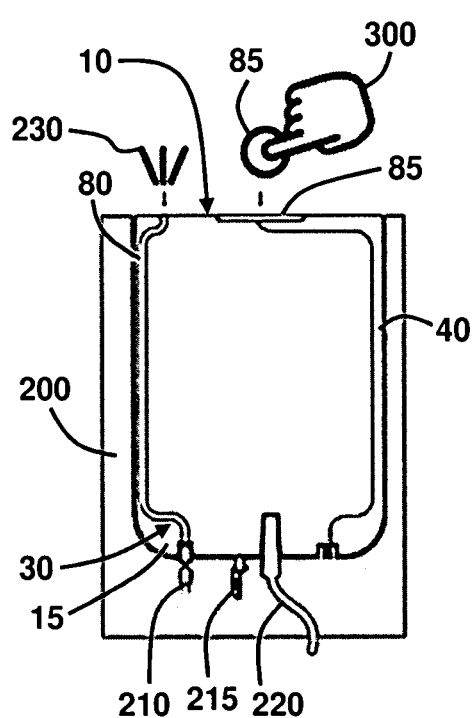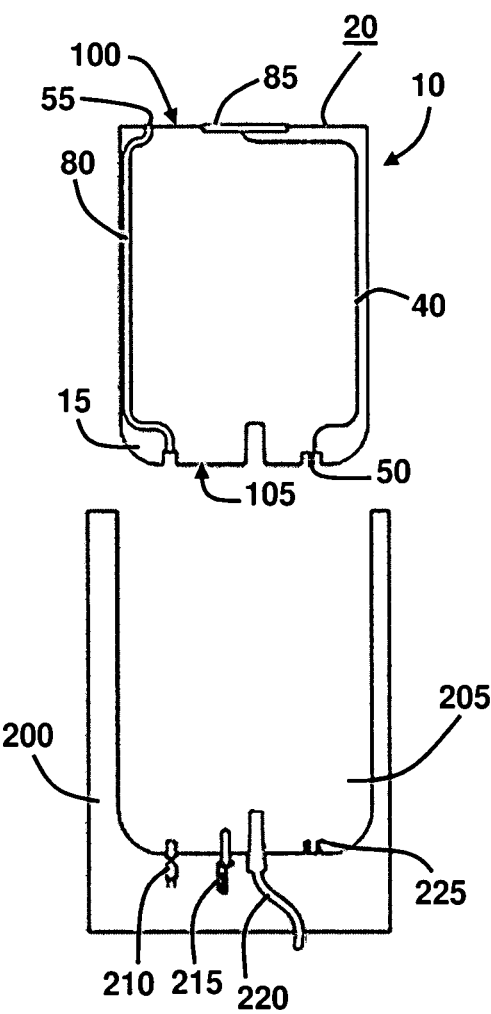

PRINT CARTRIDGES WITH LIGHT PIPES AND TOUCH SENSITIVE CIRCUITS

BACKGROUND

Print cartridges are manually inserted and removed from printers during routine maintenance and on an as-needed basis. The print cartridges are often housed within internal compartments of the printer with a door or cover on the compartment. Printer control panels may indicate whether a print cartridge requires replacement.

BRIEF DESCRIPTION OF THE DRAWINGS

FIG. 5A is a schematic diagram illustrating a cross-sectional view of a print cartridge installed in a printer, according to an example.

FIG. 5B is a schematic diagram illustrating a cross-sectional view of a print cartridge aligned for installation in a printer, according to an example.

DETAILED DESCRIPTION

The bezels surrounding print cartridges are often spatially constrained thereby increasing the challenge to develop new types of print cartridges that can properly align in a printer. The examples described herein provide a print cartridge having an integrated light pipe and a touch sensitive sensor. The print cartridge allows a user to have visual cues as to the status of the print cartridge; e.g., full, empty, damaged, properly/improperly inserted, etc. as well as allowing for an easier insertion/removal process by eliminating the conventional hard push to trigger the unlatching of print cartridges from a printer. The light pipe aligns with a lighting element from the printer, which may provide different color lights that are visually noticeable on the surface of the print cartridge. The touch sensor utilizes only a slight touch by a user to trigger the latching/unlatching of the print cartridge from the printer's cartridge housing. The printer's control panel may also provide alerts associated with the status of the print cartridge based on the lighting parameters of the lighting element of the printer, among other factors.

Figure 1:
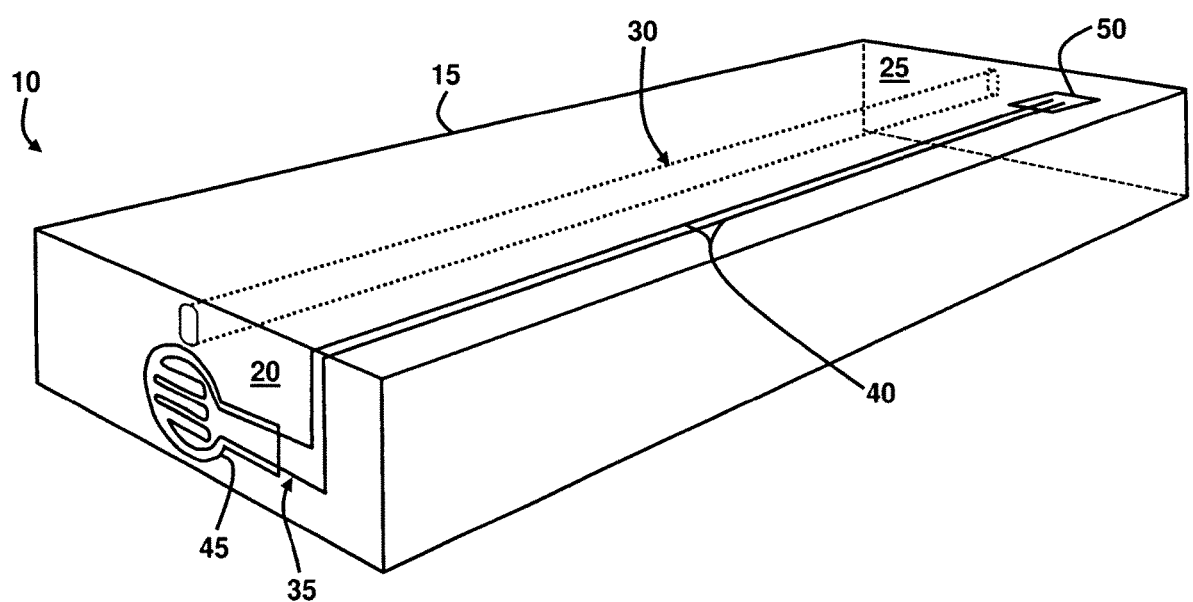
FIG. 1 is a schematic diagram illustrating a perspective view of a print cartridge, according to an example.

FIG. 1 is a schematic diagram illustrating a perspective view of a print cartridge 10, according to an example. The print cartridge 10 may be a two-dimensional (2D) or three-dimensional (3D) printing ink or agent cartridge, according to various examples. The print cartridge 10 comprises a cartridge housing body component 15 comprising a first surface 20 and a second surface 25, a built-in light pipe 30 in the cartridge housing body component 15 and exposed at the first surface 20 and the second surface 25 of the cartridge housing body component 15, and an electrical component 35 at least partially positioned in, on, or along the cartridge housing body component 15. The cartridge housing body component 15 may have any configuration suitable for use in any type of 2D or 3D printer. The cartridge housing body component 15 may comprise flat, curved, or textured surfaces and may be constructed of any suitable type of material used in print cartridge manufacturing. The electrical component 35 comprises conductive traces 40 positioned in, on, or along the cartridge housing body component 15, a touch sensitive circuit 45 connected to the conductive traces 40, and an electrical connection terminal 50 connected to the conductive traces 40. According to some examples, the electrical conductive trace 40 may be foil stamped, silk screened, set in decal form, or set as part of an applied label to the housing body component 15. The conductive trace 40 may be visible on the exterior of the housing body component 15 or hidden on the reverse side of a label, according to an example.

Figure 2A:
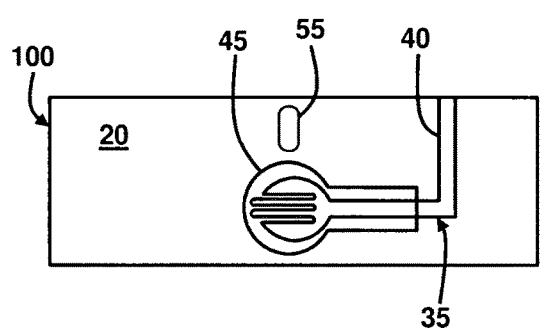
FIG. 2A is a schematic diagram illustrating a front view of a print cartridge, according to an example.

FIG. 2A, with reference to FIG. 1, is a schematic diagram illustrating a front view of the print cartridge 10, according to an example. The print cartridge 10 comprises a first body end 100 having the first surface 20. The first surface 20 may be flat, curved, or textured. The touch sensitive circuit 45 is visible and accessible on the first surface 20. The portion of the conductive trace 40 connected to the touch sensitive circuit 45 may also be visible on the first surface 20. The conductive trace 40 may also be positioned within the housing body component 15 and throughout the cartridge housing body component 15. The light pipe 30 may comprise an end face 55 on the first surface 20. The end face 55 may comprise a closed end of the light pipe 30 and comprises a transparent or translucent material. Additionally, the end face 55 may comprise a flat, curved, or textured surface and may or may not be planar with the first surface 20. Moreover, the end face 55 may be positioned anywhere on the first surface 20.

Figure 2B:
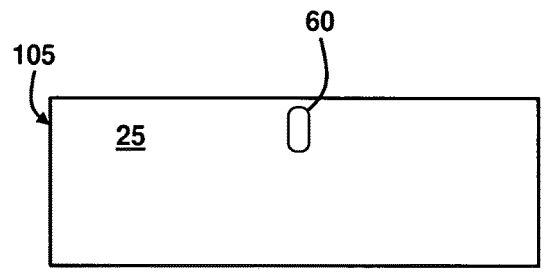
FIG. 2B is a schematic diagram illustrating a rear view of a print cartridge, according to an example.

FIG. 2B, with reference to FIGS. 1 and 2A, is a schematic diagram illustrating a rear view of the print cartridge 10, according to an example. The print cartridge 10 comprises a second body end 105 having a second surface 25. The second surface 25 may be flat, curved, or textured. The light pipe 30 may comprise an interface 60 on the second surface 25. In one example, the interface 60 is an open end of the light pipe 30. In another example, the interface 60 may also be closed or partially closed. However, because light is directed into the interface 60 from a lighting element provided in a printer, the interface 60 is properly configured to accept the light and direct it towards the end face 55 without much loss of light intensity, distortion, reflection, or blockage. The end face 55 and interface 60 are distal ends, respectively, of the light pipe 30. The interface 60 may be positioned anywhere on the second surface 25. Moreover, because the light pipe 30 may comprise a transparent or translucent, plastic material and may direct light from its interface 60 towards the end face 55, according to an example, the end face 55 and interface 60 do not necessarily have to be aligned with respect to one another. However, in one example the light pipe 30 may comprise a substantially straight configuration such that the end face 55 and interface 60 are aligned with one another on their respective surfaces 20, 25. As indicated, the interface 60 may be located distally away from the end face 55 spanning the entire length of the cartridge housing body component 15, according to an example. However, in alternative examples, the interface 60 does not have to be positioned on the second surface 25, and instead may be positioned on other surfaces of the cartridge housing body component 15 near the second body end 105. Accordingly, the light pipe 30 is not restricted to being a straight configuration, and as such the light pipe 30 may comprise curves and bends as desired to fit within the cartridge housing body component 15.

Figure 3A:
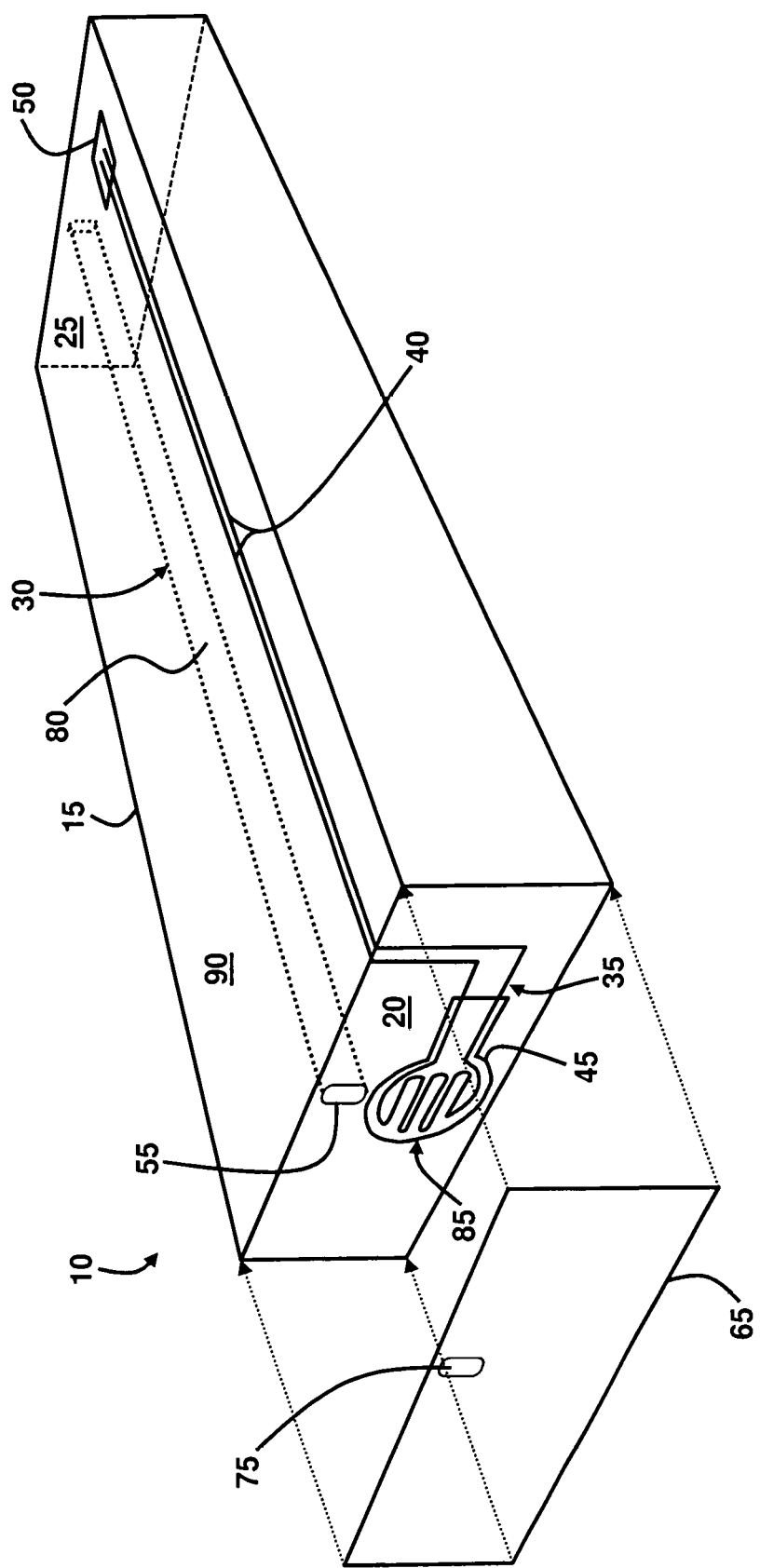
FIG. 3A is a schematic diagram illustrating a perspective view of a print cartridge with a label for alignment, according to an example.

FIG. 3A, with reference to FIGS. 1 through 2B, is a schematic diagram illustrating a perspective view of the print cartridge 10, according to another example. In one example, the touch sensitive circuit 45 is flexible. In this regard, the touch sensitive circuit 45 may be applied to a non-flat print cartridge. A touch sensor 85 is exposed on the first surface 20 of the cartridge housing body component 15. The touch sensor 85 may comprise the touch sensitive circuit 45. The touch sensitive circuit 45 comprises a pattern to demarcate the zone of the touch sensor 85.

In FIG. 3A, a label 65 is shown being aligned for affixation with the first surface 20 of the print cartridge 10. In an example, the label 65 comprises a hole 75. In another example, the label 65 contains no hole. The print cartridge 10 comprises conductive traces 40 connected to the touch sensitive circuit 45 and may be positioned in, along, or on the cartridge housing body component 15. In an example, portions of the light pipe 30 may be reflective. In an example, the electrical connection terminal 50 is connected to the conductive traces 40 and exposed on a surface 90 of the housing body component 15. The electrical connection terminal 50 may be set on the second surface 25 or any of the other surfaces 90 of the cartridge housing body component 15 near the second body end 105. In an example, the light pipe 30 may be a hollow tube 80 extending through the cartridge housing body component 15. The hollow tube 80 may be transparent, translucent, or reflective in some examples. The hollow tube 80 may be colored in another example. Various colors or color combinations may be used for the hollow tube 80 such that the color permits the transmission of light that is directed therein by a separately positioned lighting element in the printer. The light pipe 30 may be visible on a portion of the surface 20, 25 of the cartridge housing body component 15. In this regard, the end face 55 of the light pipe 30 is visible on the first surface 20, and the interface 60 of the light pipe 30 is visible on the second surface 25. However, as indicated above, the interface 60 may also be suitably positioned on surfaces other than the second surface 25. The hollow tube 80 may comprise an end cap; e.g., end face 55, at a location where the hollow tube 80 is visible on the portion of the surface 20 of the cartridge housing body component 15. The sensitivity of the touch sensor 85 may be suitably selected depending on the thickness of the label 65 among other factors, and the pressure necessary to be exerted on the touch sensor 85 to trigger actuation of the touch sensor 85.

Figure 3B:
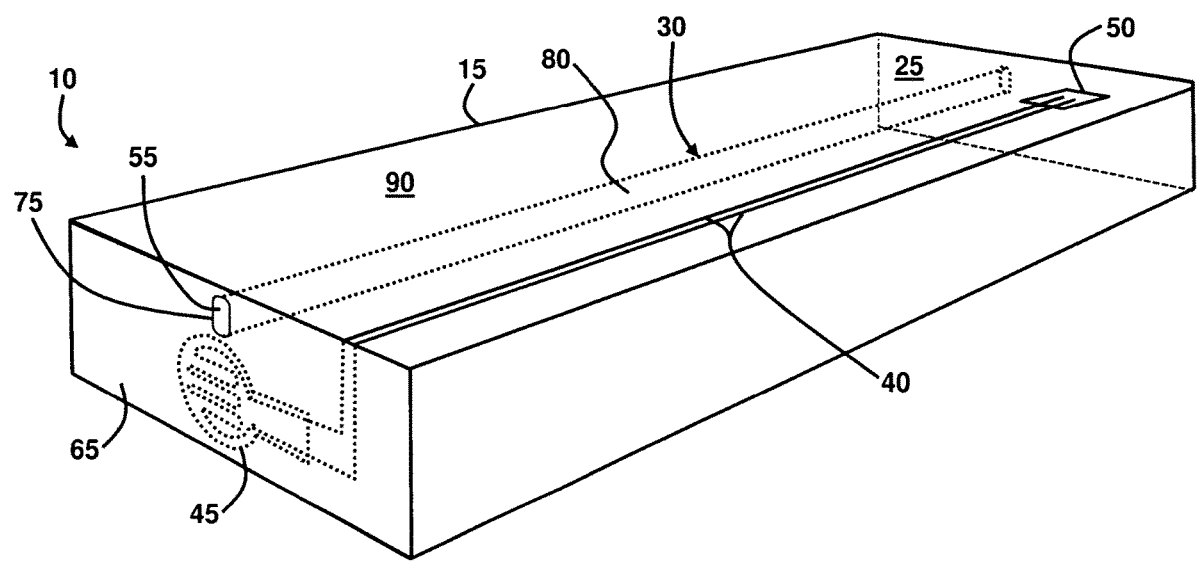
FIG. 3B is a schematic diagram illustrating a perspective view of a print cartridge with a label attached, according to an example.

FIG. 3B, with reference to FIGS. 1 through 3A, is a schematic diagram illustrating a perspective view of a print cartridge 10 with the cartridge housing label 65 positioned over the first surface 20 and over the touch sensitive circuit 45. In the example of FIG. 3B, the cartridge housing label 65 comprises a hole 75 positioned over and aligned with the end face 55 of the light pipe 30. The label 65 may or may not align with the entire first surface 20. Furthermore, the label 65 may or may not be transparent. In an example where the label 65 is not transparent, the label 65 may comprise other indicia depicting the position of the underlying touch sensitive circuit 45. For example, the indicia may include an outline image, shape, or lines depicting the position of the touch sensitive circuit 45.

Figure 3C:
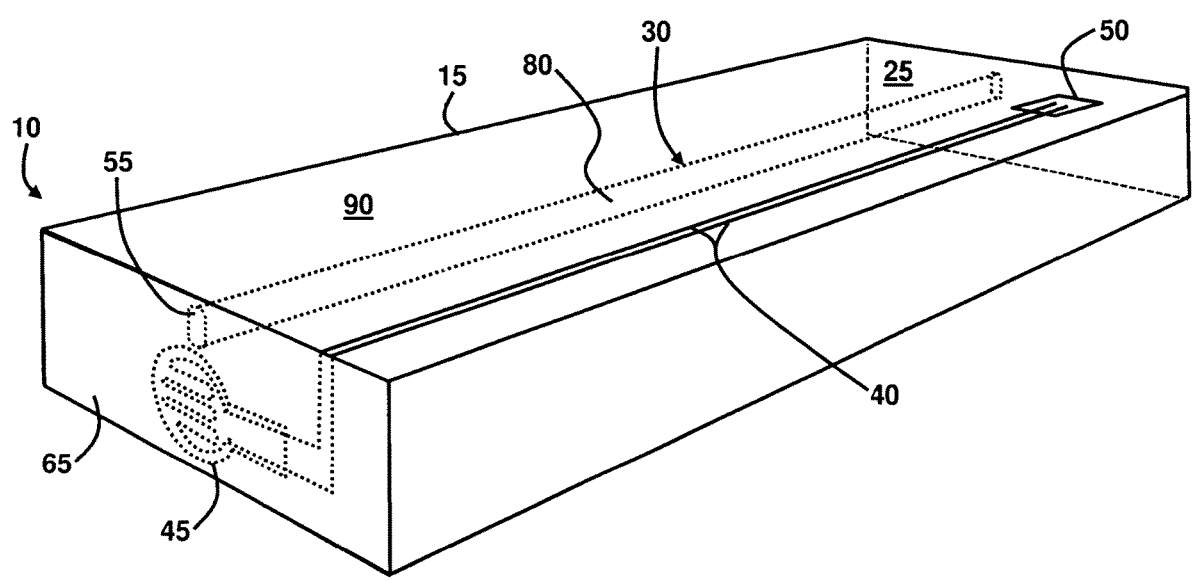
FIG. 3C is a schematic diagram illustrating a perspective view of a print cartridge with a label attached, according to another example.

FIG. 3C, with reference to FIGS. 1 through 3B, is a schematic diagram illustrating a perspective view of a print cartridge 10 with a label 65 attached, according to another example. In this example, the label 65 is transparent and may contain no holes. The underlying touch sensitive circuit 45 and end face 55 of the light pipe 30 are visible behind the transparent label 65. Although the label 65 is transparent in this example, the label 65 may also comprise other indicia depicting the position of the underlying touch sensitive circuit 45. In another example, the label 65 may be transparent and also contain a hole 75 to align with the end face 55 of the light pipe 30. According to another example, the touch sensitive circuit 45 is set as part of the label 65, whereby the combined label 65 and touch sensitive circuit 45 are attached to the first surface 20 with the touch sensitive circuit 45 being properly aligned and electrically connected to the conductive traces 40.

Figure 4:
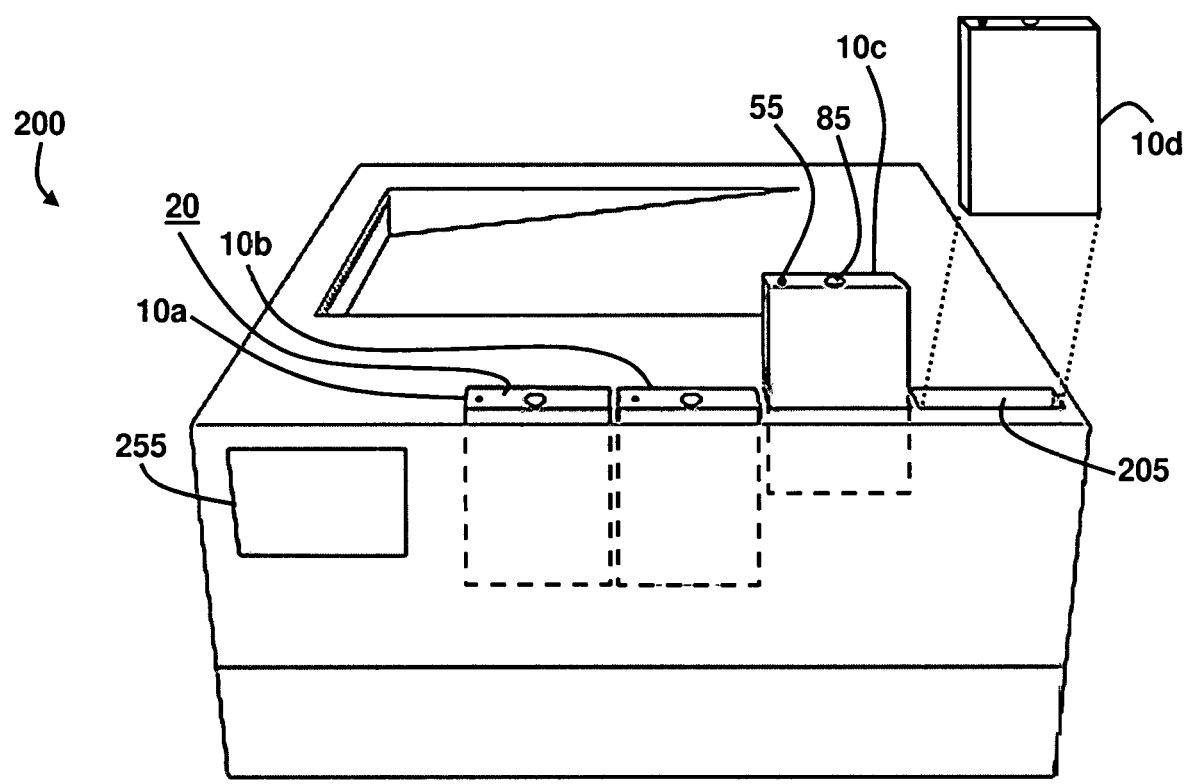
FIG. 4 is a schematic diagram illustrating a perspective view of a printer with installed print cartridges, according to an example.

FIG. 4, with reference to FIGS. 1 through 3C, is a schematic diagram illustrating a perspective view of a printer 200 with print cartridges 10a-10d, according to an example. While only four print cartridges 10a-10d are shown in FIG. 4, the printer 200 may be set to receive any number of print cartridges 10 and have a corresponding number of receiving slots 205. The print cartridges 10a-10d are installed or installable in their respective receiving slots 205 of the printer 200. The print cartridges 10a-10d, which are similarly configured as print cartridge 10 from FIGS. 1 through 3C, comprises touch sensor 85 and end face 55 that are visible on the print cartridges 10a-10d. In FIG. 4, print cartridges 10a and 10b are shown inserted into the printer 200 with the surface 20 visible while the print cartridges 10a, 10b are fully installed in the printer 200. Print cartridge 10c is shown partially inserted in the printer 200. Print cartridge 10d is shown removed from the printer 200. Receiving slot 205 is shown empty where print cartridge 10d may be inserted. As such, each of the print cartridges 10a-10d are inserted into their own respective receiving slots 205. In one example, there are no doors or covers over the print cartridges 10a-10d once they are all installed in the printer 200. In other examples, there may be a translucent covering, not shown, over the print cartridges 10; e.g., a frosted output tray, etc., through which the light emitted through the end face 55 of the light pipe 30 is visible through the translucent covering.

A control panel 255 of the printer 200 is communicatively coupled to the print cartridges 10a-10d such that the control panel 255 provides the status and operational details related to the print cartridges 10a-10d as well as the receiving slots 205 of the printer 200. The control panel 255 receives the details related to the print cartridges 10a-10d through various interfaces, further described below, that are part of the printer 200. In an example, the control panel 255 may provide the ink levels, alignment indication, presence/absence, as well as any other operational details of the respective print cartridges 10a-10d. In one example, each print cartridge 10a-10d may correspond to a different color print cartridge; e.g., cyan, magenta, yellow, and black, etc.

FIG. 5A, with reference to FIGS. 1 through 4, is a schematic diagram illustrating a cross-sectional view of a print cartridge 10 installed in printer 200, according to an example. The light pipe 30 interfaces with the lighting element 210 of the printer 200. However, the lighting element 210 is separately configured from the light pipe 30 and is not part of the print cartridge 10. Moreover, in an example, each light pipe 30 and/or corresponding end face 55 from amongst the different print cartridges 10a-10d, in FIG. 4, may comprise a different color and/or the corresponding lighting element 210 may emit a different color light 230 thereby providing further differentiation amongst the different print cartridges 10a-10d installed in the printer 200. In other examples, each light pipe 30 and/or corresponding end face 55 from amongst the different print cartridges 10a-10d may comprise a light pipe 30 having the same color, or no color, and may be aligned with a lighting element 210 that emits the same color of light 230.

In one example of FIG. 5A, the lighting element 210 may emit a green-colored light 230 to indicate that the print cartridge 10 is operationally sound or that upon installation into the printer 200, the alignment of the print cartridge 10 is correct and that the print cartridge 10 is ready to be used. In another example, the lighting element 210 may emit a red-colored light 230 to indicate that the print cartridge 10 is not operationally sound, is empty, or that upon installation into the printer 200, the alignment of the print cartridge 10 is incorrect and that the print cartridge 10 is not ready to be used. In other examples, the light 230 may be a flashing light or may have variable intensities to provide a more distinct visual alert to a user 300. Several alternatives for the type and sequencing of the light 230 that is relayed from the lighting element 210 of the printer 200 through the light pipe 30, and out through the end face 55 may exist in accordance with various examples herein.

The conductive trace 40 may continue down the exterior of the cartridge housing body component 15 so as to reach the electrical connection terminal 50 and align with a corresponding electrical connection 225 of the printer 200, which is the location where the conductive trace 40 may interface electronically with the printer 200 when the print cartridge 10 is installed therein. The electrical connection 225 may provide the communicable interface of the print cartridge 10 to the control panel 255 of the printer 200, of FIG. 4. The light pipe 30 and conductive trace 40 may be inert when the print cartridge 10 is not installed in the receiving slot 205 of the printer 200. The lighting element 210 of the printer 200 may comprise a light-emitting diode, according to one example. Other types of lighting elements may also be provided in accordance with the examples herein. The printer 200 may also include an ejection mechanism 215 and a septum 220 as well as other components that may interface and interact with the print cartridge 10. However, the lighting element 215, ejection mechanism 215, and septum 220 are all part of the printer 200 and are not part of the print cartridge 10. As further indicated in FIG. 5A, a user 300 may press the touch sensor 85 on the print cartridge 10, and may do so in response to a particular light 230 emitted from the light pipe 30. In other examples, the user 300 may press the touch sensor 85 in response to a particular command, set of instructions, information, image, or graphical display, etc. provided on the control panel 255, of FIG. 4.

FIG. 5B, with reference to FIGS. 1 through 5A, is a schematic diagram illustrating a cross-sectional view of a print cartridge 10 aligned for installation in a printer 200, according to an example. The conductive trace 40 allows interaction with the visible surface 20 or label 65 of the print cartridge 10 when it is installed in the printer 200. This allows the surface 20 of the print cartridge 10 to function as an interactive button that may be touched to elicit information about the print cartridge 10 on the control panel 255 of the printer 200, or to cause a different color or sequence of light 230 to be emitted from the lighting element 210 and through the light pipe 30, or to initiate the automated mechanical ejection mechanism 215 of the printer 200 to eject the print cartridge 10 from the receiving slot 205 of the printer 200. In one example, the light pipe 30 may be activated in conjunction with any of the print cartridge 10 and the printer 200 sensing a touch interaction of the touch sensor 85 on the print cartridge 10. The light pipe 30 may be structurally set within or on the cartridge housing body component 15, in one example. Alternatively, in another example the light pipe 30 may also be set on a moving part within or on the cartridge housing body component 15, where the lighting element 210 of the printer 200 is stationary. When the light pipe 30 comes into contact or is aligned with the lighting element 210 of the printer 200, or perhaps another light pipe, then the light pipe 30 transmits the light 230 originally emitted from the lighting element 210, along the length of the light pipe 30 and out through the end face 55. In this regard, the end face 55 acts as a visual indicator of the operational status of the print cartridge 10.

Figure 6:
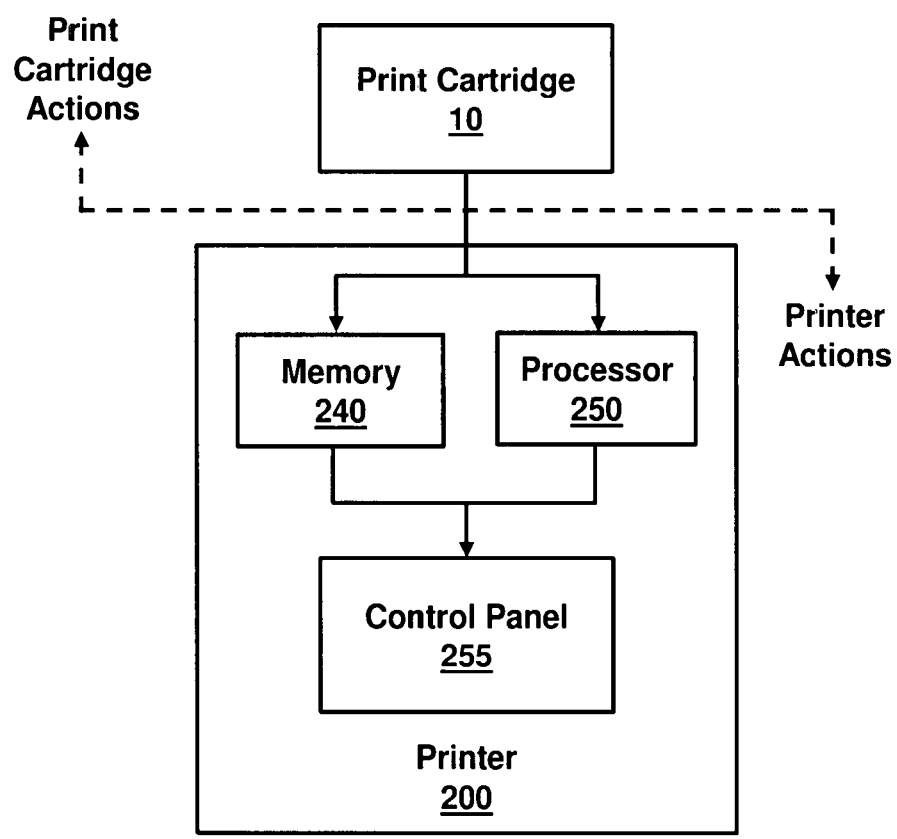
FIG. 6 is a system block diagram, according to an example.

FIG. 6, with reference to FIGS. 1 through 5B, is a system block diagram, according to an example. The light pipe 30 of the print cartridge 10 may be activated by a processor 250 of the printer 200 at appropriate times to communicate the status or direct users 300 to its location when a prompted interaction occurs on the control panel 255 of the printer 200. In an example, a user 300 may receive a message on his/her smartphone or other communication device from the printer 200 indicating that a print cartridge 10c, for example, is empty. The user 300 may approach the printer 200 and sees a flashing indicator light 230 on the end face 55 of the light pipe 30, which is visible through the label 65 or hole 75 in the label 65 covering the first surface 20 of the housing body component 15. The user 300 may then touch the touch sensor 85 of the touch sensitive circuit 45 on the print cartridge 10c. The processor 250 transmits a signal to the ejection mechanism 215 of the printer 200, which then pushes against the print cartridge 10c, which then partially pops out of the receiving slot 205 of the printer 200. For example, the ejection mechanism 215 may be a spring-actuated mechanism. Other types of ejection mechanisms may be used in accordance with the examples herein. The user 300 may now comfortably grasp and remove print cartridge 10c. The user 300 may then install a new print cartridge 10c, and when correctly seated within the receiving slot 205 of the printer 200, the indicator light 230 displayed through the end face 55 of the light pipe 30 displays a particular color; e.g., green, for example, for a predetermined period of time to communicate a successful installation of the new print cartridge 10c to the user 300.

The control panel 255 may provide details of the print cartridge device 10 including a visual display of the housing body component 15 comprising the first body end 100 and the second body end 105. The light pipe 30 may be graphically depicted as a hollow tube 80 of various configurations and positioned through the housing body component 15. The control panel 255 may further indicate that the light pipe 30, which comprises the closed pipe end; e.g., end face 55, and the open pipe end; e.g., interface 60, are properly aligned in the printer 200. For example, the control panel 255 may indicate or graphically depict that the closed pipe end; e.g., end face 55, is aligned with the first body end 100, and the open pipe end; e.g., interface 60, is aligned with the second body end 105. In addition to the closed pipe end; e.g., end face 55, being visible on the outer surface 20 of the first body end 100, the control panel 255 may also depict an image showing a representation of the end face 55 and its positioning in the printer 200. This may provide a user 300 with an alternative view of the print cartridge 10. The control panel 255 may further graphically depict the positioning of the touch sensitive circuit 45, which is on the outer surface 20 of the first body end 100. Again, this may provide a user 300 with an alternative view of the touch sensitive circuit 45.

The control panel 255 may also graphically depict the electrical conductive trace 40 being connected to the touch sensitive circuit 45 and extending through or on the housing body component 15 from the first body end 100 towards the second body end 105. In this regard, if there is a break or defect in the electrical conductive trace 40 or the touch sensitive circuit 45, then the control panel 255 may graphically depict where such a break or defect exists. Similarly, the control panel 255 may graphically depict the electrical connection terminal 50, which is connected to the electrical conductive trace 40 and positioned proximate to the second body end 105. As indicated, there may be a covering, such as the cartridge housing label 65, over the first body end 100. The label 65 may be colored or have some other indicia indicating reference to the particular color ink related to a corresponding print cartridge 10. As such, the control panel 255 may similarly graphically depict the label 65 according to the corresponding color associated with its print cartridge 10. According to an example, the covering; e.g., label 65, is set to permit visibility of the closed pipe end; e.g., end face 55, of the light pipe 30. The control panel 255 is set to provide another manner of determining the status of the print cartridge 10 apart from the light 230 emitted out of the end face 55 of the light pipe 30.

The control panel 255 receives instructions from the processor 250 to perform the various functions and provide the various information and graphical depictions described above. The instructions may be generated through resident software, firmware, microcode, etc. stored in memory 240 and processed by processor 250. The actions of the print cartridge 10 are distinct from the actions of the printer 200. However, through the interface of the electrical connection terminal 50 on the print cartridge 10 with the electrical connection 225 of the printer 200, the print cartridge 10 may interact with the printer 200. The light 230 may be constantly displayed through the end face 55 of the light pipe 30, in one example. Alternatively, the light 230 may periodically be dimmed or turned off.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A print cartridge comprising:
   a cartridge housing comprising a first surface and a second surface;
   a light pipe in the cartridge housing and exposed at the first surface and the second surface of the cartridge housing;
   an electrical component at least partially positioned in, on, or along the cartridge housing and comprising:
      conductive traces positioned in, on, or along the cartridge housing;
      a touch sensitive circuit connected to the conductive traces; and
      an electrical connection terminal connected to the conductive traces;
   a cartridge housing label positioned over the first surface and over the touch sensitive circuit.

2. The print cartridge of claim 1, wherein the light pipe comprises:
   an end face on the first surface; and
   an interface on the second surface.

3. The print cartridge of claim 2, wherein the cartridge housing label comprises a hole positioned over the end face of the light pipe.

4. The print cartridge of claim 1, wherein the cartridge housing label is colored to correspond with a color of ink associated with the print cartridge.

5. The print cartridge of claim 1, wherein the cartridge housing label is transparent.

6. The print cartridge of claim 1, wherein the touch sensitive circuit is flexible.

7. A print cartridge comprising:
   a body component comprising an outer surface;
   a hollow tube extending through the body component and visible on a portion of the outer surface of the body component;
   a touch sensor exposed on the outer surface of the body component;
   conductive traces connected to the touch sensor;
   an electrical connection terminal connected to the conductive traces; and
   a covering positioned over the outer surface and the touch sensor.

8. The print cartridge of claim 7, wherein the touch sensor comprises a touch sensitive circuit.

9. The print cartridge of claim 8, wherein the conductive traces are positioned in the body component.

10. The print cartridge of claim 9, wherein the electrical connection terminal is exposed on the outer surface of the body component.

11. The print cartridge of claim 7, wherein the hollow tube is transparent.

12. The print cartridge of claim 7, wherein the hollow tube is colored.

13. The print cartridge of claim 7, wherein the hollow tube comprises an end cap at a location where the hollow tube is visible on the portion of the outer surface of the body component.

14. A device comprising:
   a housing body component comprising a first body end and a second body end;
   a light pipe positioned through the housing body component, wherein the light pipe comprises a closed pipe end and an open pipe end, wherein the closed pipe end is aligned with the first body end, and the open pipe end is aligned with the second body end, and wherein the closed pipe end is visible on an outer surface of the first body end;
   a touch sensitive circuit on the outer surface of the first body end;
   an electrical conductive trace connected to the touch sensitive circuit and extending through or on the housing body component from the first body end towards the second body end;
   an electrical connection terminal connected to the electrical conductive trace and positioned proximate to the second body end; and
   a covering over the first body end.

15. The device of claim 14, wherein the covering is set to permit visibility of the closed pipe end of the light pipe.

16. The device of claim 14, wherein the covering comprises a hole.

17. The device of claim 16, wherein the hole is aligned with the closed pipe end of the light pipe.

18. The device of claim 14, wherein the closed pipe end is transparent or translucent.

19. The device of claim 14, wherein the light pipe is reflective.

20. The device of claim 14, wherein a thickness of the covering controls a sensitivity of the touch sensitive circuit to be actuated.

* * * * *